United States Patent [19]

Teuling

[11] 4,031,453

[45] June 21, 1977

[54] TRIGGERED TRANSISTOR SWITCHING REGULATOR

[75] Inventor: Dirk Johan Adriaan Teuling, Eindhoven, Netherlands

[73] Assignee: U.S. Philips Corporation, New York, N.Y.

[22] Filed: Nov. 13, 1975

[21] Appl. No.: 631,736

[30] Foreign Application Priority Data

Dec. 2, 1974  Netherlands ..................... 7415666

[52] U.S. Cl. .................................. 321/2; 315/411
[51] Int. Cl.² .......................................... H02P 13/22
[58] Field of Search ................ 321/2; 178/DIG. 11; 323/DIG. 1; 315/408, 411

[56] References Cited

UNITED STATES PATENTS

| 3,504,263 | 3/1970 | Schaefer | 321/2 |
| 3,697,852 | 10/1972 | Gerbitz | 321/2 |
| 3,831,079 | 8/1974 | Iwata | 321/2 |
| 3,859,590 | 1/1975 | Cielo et al. | 323/DIG. 1 |

FOREIGN PATENTS OR APPLICATIONS

| 3,490 | 1/1971 | Japan | 178/DIG. 11 |

Primary Examiner—William H. Beha, Jr.
Attorney, Agent, or Firm—Frank R. Trifari; Bernard Franzblau

[57] ABSTRACT

A switched-mode power supply in which disturbing oscillations which are produced by the associated (auto) transformer are eliminated by means of a clipping circuit, a supply voltage being generated for the driver stage which controls the switch. This measure saves an expensive resistor and ensures a better operation of the circuit at a varying input voltage.

10 Claims, 4 Drawing Figures

TRIGGERED TRANSISTOR SWITCHING REGULATOR

The invention relates to a switched-mode power supply for converting an input voltage into a substantially constant output D.C. voltage wherein a driver stage supplys a periodic pulse shaped control signal to a switch to render it conducting during a first part of the period and to block it during the remaining, second part of the period, with a control of the duration of said parts of the period, and output electrode of the switch being connected to a terminal of the input voltage source through a self-inductance.

In such a circuit, energy which is derived from the input voltage source is stored in the self-inductance during the time the switch is conducting. If thereafter the switch is blocked, then this energy causes a current to flow through a rectifier, which current generates the output voltage across a load. In these circumstances a square wave voltage is present across the self-inductance. If now the self-inductance is a winding of a transformer or of an auto-transformer, then an oscillation is superimposed on this voltage after the starting moment of the second part of the period. At the moment that the switch is blocked, the current flowing in the leakage inductance of the transformer cannot be immediately blocked, which causes a high frequency oscillation to be produced which is determined by the leakage inductance and the parasitic capacitances. This oscillation increases the voltage across the switch at switch-off and, consequently, this voltage may assume a dangerously high value. The oscillation may also radiate in the apparatus in which the power supply is incorporated and may have a detrimental effect on parts thereof.

This undesired oscillation can be damped by means of a clipping circuit, in which circuit a rectifier conducts only when the voltage across the switch would otherwise rise to a value above its value at the end of the second part of the period. Because the dissipation in the resistor is considerable it must be able to withstand a high permissible power and consequently it is a costly component.

A further problem is supplying the driver stage. This stage cannot be supplied by the output voltage as the circuit could not start when first switched on. It is therefore normal practice to choose the input voltage source as a power supply for the driver stage, for which a resistor is also used. However, because the input voltage is not stabilized, the current through the driver stage and consequently also the control current of the switch may vary. If the input voltage varies in the controlled state, then also the conduction time of the switch varies and it appears that the variation of the current through the driver stage may be too large for a proper operation of the circuit and/or exceeds the permissible variation specified by the manufacturer of the transistor. Because the control energy of the switch is considerable, this resistor also must have a high permissible power.

The circuit according to the invention is characterized in that an electrode of a rectifier is coupled to said self-inductance while a smoothing capacitor and a supply resistor for the driver stage are connected to another electrode thereof. By means of this measure the two above resistors are combined into one resistor which yields a saving. In addition, the circuit for clipping the undesired oscillation has a second function, namely generating a supply voltage for the driver stage. Furthermore, in the stationary mode this supply voltage is now the sum of the input and of the output voltage or of a voltage derived therefrom and is consequently more constant than in the case where this supply voltage was the input voltage, so that the variation of the current through the driver stage is smaller. Another advantage of the measure according to the invention is that the supply voltage of the driver stage is comparatively low during starting after switch-on, so that the control current of the switch is small for the time that the duration of the first part of the period is short, which is favourable for achieving a gradual increase of the output voltage.

The invention will now be described, by way of example, with reference to the accompanying drawings in which.

Figure 1:
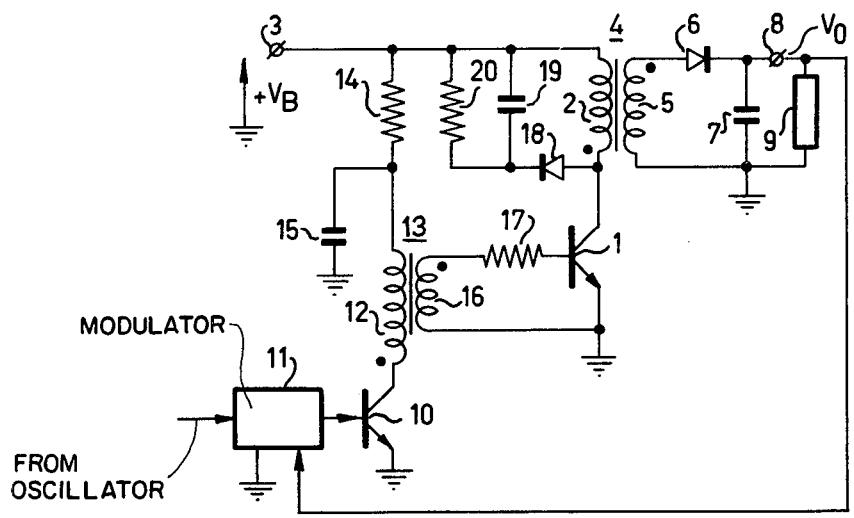
FIG. 1 is a circuit useful for explaining the invention.

In the circuit of FIG. 1 reference numeral 1 represents a transistor of the n-p-n type which functions as a switch. Its collector is connected through a winding 2 to the positive terminal 3 of an input voltage source, whereas its emitter is connected to the negative terminal of the source, which terminal may be connected to ground. Winding 2 is the primary winding of a transformer 4, a secondary winding 5 of which is connected between ground and the anode of a diode 6. The winding senses of windings 2 and 5 have been chosen such that diode 6 conducts when transistor 1 is blocked and vice versa, which is indicated by means of polarity dots. A capacitor 7 is connected between the cathode of diode 6 and ground. This cathode forms a terminal 8 at which the output voltage $V_o$ of the circuit appears and to which a load 9 is connected.

Transistor 1 conducts during a first part $\delta T$ of the period T of a pulse-shaped control signal fed to its base. Its collector current flows through winding 2 in which energy derived from the voltage source is stored. At the moment at which transistor 1 is blocked this energy produces a current through winding 5 and diode 6. The control signal for transistor 1 is supplied by a driver transistor 10. An oscillator, not shown in FIG. 1, generates a signal, which, through a modulator 11 and possibly an amplifier, drives the base of transistor 10. The collector of this transistor is connected through a primary winding 12 of a driver transformer 13 and a resistor 14 to terminal 3, and its emitter is connected to ground. The junction point of resistor 14 and winding 12 is connected to ground through a smoothing capacitor 15. Via a resistor 17 a secondary winding 16 of transformer 13 drives the base of transistor 1. In this example the non-simultaneous drive of transistor 1 has been opted for, i.e. transistor 1 conducts when transistor 10 is blocked and vice versa. This is obtained by the choice of the winding senses of windings 12 and 16, which is indicated in FIG. 1 by polarity dots.

Modulator 11 comprises a comparison stage in which the voltage $V_o$ is compared with a reference voltage, whereby in known manner control of the duration $\delta T$ of the conduction time of transistor 1 is obtained to substantially keep voltage $V_o$ constant in spite of possible variations of the input voltage $V_B$ at terminal 3 and/or of load 9.

Figure 2:
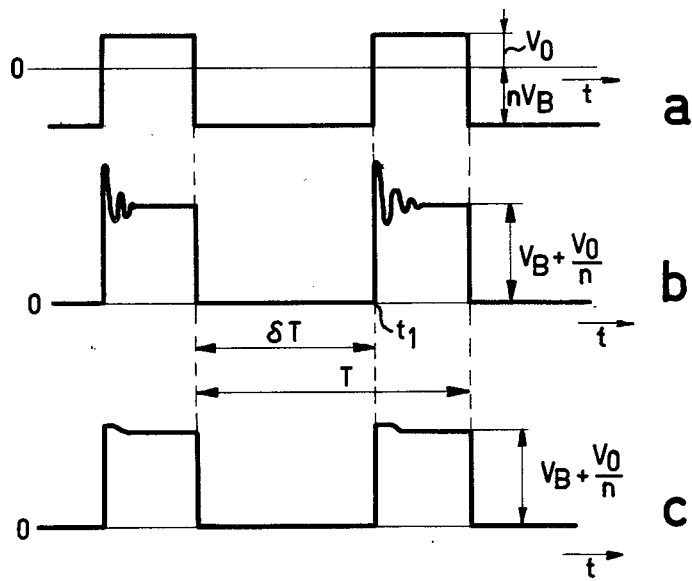
FIG. 2 shows wave forms of the voltages produced therein.

In FIG. 2a the voltage at the anode of diode 6 and in FIG. 2b the voltage at the collector of transistor 1 has been plotted. As is known the first mentioned voltage in the first part $\delta$ T of the period takes the value $-nV_B$ and in the second part the value $V_o$, while the voltage of FIG. 2b is zero in the time $\delta$ T and thereafter takes the value $V_B + (V_o/n)$, 1:n being the ratio between the number of turns of windings 2 and 5. At the moment $t_1$ at which transistor 1 is blocked, the current flowing in the leakage inductance of transformer 4 can not be immediately blocked. A high frequency oscillation of decreasing amplitude is produced which is determined by the leakage inductance and the parasitic capacitances. This oscillation causes an increase in the collector voltage and a radiation into the apparatus (not shown) which is supplied with the supply voltage by the circuit of FIG. 1.

These undesired effects can be avoided for the greater part by means of a clipping circuit which consists of a diode 18, a capacitor 19 and a resistor 20. The anode of diode 18 is connected to the collector of transistor 1, while the parallel circuit consisting of capacitor 19 and resistor 20 is connected between the cathode of diode 18 and terminal 3. If the value of resistor 20 is low enough, the energy of the oscillation is then dissipated in this resistor so that the voltage at the collector remains, during the entire second part of the period, substantially equal to its final value $V_B + (V_o/n)$. FIG. 2c shows diagrammatically the variation of this voltage. At the cathode of diode 18 a d.c. voltage is present which is equal to $V_B + (V_o/n)$. Current only flows through diode 18 when the collector voltage would otherwise rise above this value. Thereafter capacitor 19 discharges into resistor 20. The dissipation in the resistor is not inconsiderable so that the resistor must have a high permissible power.

Figure 3:
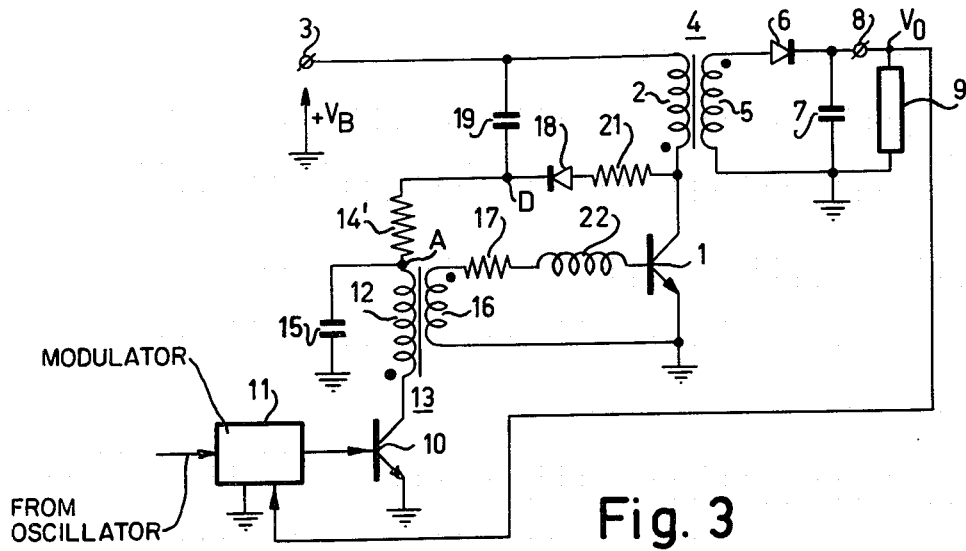
FIG. 3 shows an embodiment of the circuit according to the invention.

FIG. 3 shows the circuit according to the invention. In this Figure the elements which also occur in the FIG. 1 circuit are given the same reference numerals. In FIG. 3 resistors 14 and 20 of FIG. 1 are replaced by one resistor 14' which is connected between junction point D of diode 18 and capacitor 19 and junction point A of winding 12 and capacitor 15. A resistor 21 of a small value (approximately 100Ω) is connected between the anode of diode 18 and the collector of transistor 1 and limits the peak current through the diode. Apart from the apparent advantage of saving an expensive resistor, the circuit of FIG. 3 also has other advantages, which will be discussed below.

As is known, in a switched-mode power supply there is a relation between input voltage $V_B$ and the ratio $\delta$ if the circuit is to provide a control mechanism whereby the output voltage $V_o$ is kept constant. If the voltage $V_B$ decreases, for example, as a result of a supply voltage decrease, then $\delta$ increases. In the example described the following equation applies:

$$V_o = \frac{n \delta V_B}{1 - \delta}.$$

If the current through resistor 14 or 14' respectively is called $I_A$, the base current of transistor 1 transformed to the primary side of transformer 13 is called $I'_B$, the voltage at point D is called $V_D$, the voltage at point A is called $V_A$ and the value of resistor 14 or 14' respectively is called R, then it can be proved that $$I'_B = \frac{I_A}{1 - \delta}$$

$$I_A = \frac{V_D - V_A}{R}$$

$$V_A = \frac{\delta}{1 - \delta} R'_B I'_B$$

where $R'_B$ is the value of resistor 17 transformed to the primary side of transformer 13. It appears from these formulae that a decrease in voltage $V_B$ results in an increase of $\delta$ and so of the current $I'_B$, whereas $I_A$ decreases if $V_D = V_B$ in the case of FIG. 1 and while $V_A$ increases. The increase in voltage $V_A$ is the cause of a further decrease of $I_A$. This strong decrease of $I_A$ affects $I'_B$ to a greater extent than the increase of $\delta$, so that $I'_B$ also decreases. In the opposite case, in which voltage $V_B$ decreases the base current of transistor 1 increases. The variation of this current at large variations in voltage $V_B$ may be so great that the transistor cannot operate in the desired way. It may in particular occur that the turn-off time of the collector current becomes too strongly dependent on the voltage $V_B$. The variation of the base current may also be greater than the permissible variation specified by the manufacturer of the transistor. The variation of the base current is greater, the lower $V_A$ is with respect to $V_D$.

In FIG. 3 $V_D$ is not equal to $V_B$ but to $V_B + (V_o/n)$. Not only is $V_A$ lower with respect to $V_D$ as in the previous case (practical values are, for example, $V_B = 300V$ and $V_B + (V_o/n) = 650V$), but now voltage $V_D$ is more constant so that the variation of the base current of transistor 1 is smaller. For a variation of 60V is equal to 20% of $V_B$, but only to of $V_D$.

When the circuit is switched on, voltage $V_B$ is very quickly available, while voltage $V_o$ is zero. The circuit can get started because diode 18 can conduct, so that $V_D = V_B$ applies. Therefore, besides the functions of clipping and supply diode, the diode also functions as a starting diode. In the beginning the duty cycle $\delta$ T of transistor 1 is very short and it is desirable that the increase thereof, and consequently that of voltage $V_o$, takes place gradually. Otherwise too heavy currents would flow to the capacitors, which are not yet charged, which might have disastrous results or which could trigger a protection circuit with the result that the power supply could not get started. Because transistor 1 must be suitable for very high powers, the storage time of the charge carriers in its base layer is very large if the transistor is saturated so that the collector current will be turned off later than the base current. This implies a variation of $\delta$ by leaps and bounds in the beginning. As, however, the initial value of $V_D$ is smaller, due to the measure according to the invention, than it is in the stationary operation, the base current is small so that at first the transistor is not driven full on, so that the collector current does substantially not flow longer than the base current and $\delta$ increases gradually. In proportion as $V_o$ is built up, transistor 1 becomes increasingly saturated. A self-inductance 22, included in the base lead of this transistor ensures, in known manner, that turning off of the collector current, which in normal operation is indeed delayed with respect to that of the base current, is effected rapidly. For simplicity this delay has not been discussed hereinbefore.

The detrimental influence of the leakage inductance of transformer 4 can also be removed by means of a capacitor which is connected between two suitable points of windings 2 and 5. Thanks to the measure according to the invention this capacitor can be dispensed with.

Figure 4:
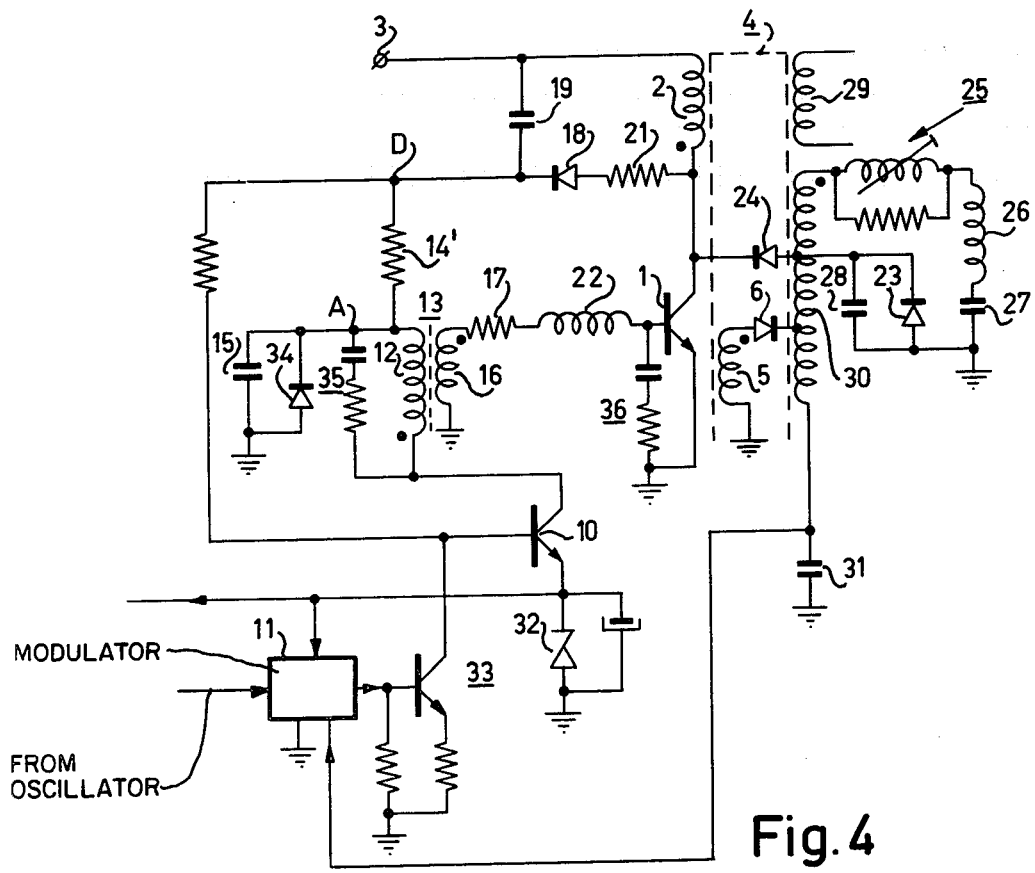
FIG. 4 shows an embodiment of the circuit according to the invention which embodiment is a part of a television receiver.

In the described embodiment the drive of transistor 1 is non-simultaneous, while the convertor 1, 4, 6, 7, 9 is of the parallel type. It will be obvious that the measure according to the invention may also be used in other embodiments. FIG. 4 shows an embodiment in which the circuit is the combination of a power supply circuit and of a line deflection circuit in a television receiver. Such a circuit was discussed in the publication "IEEE transactions on Broadcast and Television Receivers" of August 1972, volume BTR-18, Number 3, pp 177 to 182. In the circuit of FIG. 4 the deflection current flows alternatively through a parallel diode 23 and through transistor 1 and a diode 24 and through a linearity control 25 and a line deflection coil 26. Reference 27 indicates a trace and reference 28 a retrace capacitor. A plurality of windings across which supply voltages are produced are applied around the core of transformer 4. One of them, winding 29, is shown in FIG. 4. Elements 6, 23, 24, 25 and 28 are connected to various points of a further winding 30 of transformer 4. Winding 30 is connected to ground through a capacitor 31. The voltage produced across the capacitor 31 is used to control the ratio δ in modulator 11. The circuit is described in more detail in the above mentioned publication and in U.S. patent application Ser. No. 473,771, filed May 28, 1974, now abandoned and refiled on Mar. 26, 1976 as Ser. No. 670,875 and U.S. Pat. No. 3,950,674.

Some particulars of the circuit of FIG. 4 are as follows. The emitter of driver transistor 10 is not connected to ground but a low voltage is developed there which is stabilized by means of a zener diode 32, by means of which voltage the line oscillator (not shown) and modulator 11 are supplied with power. As the driver stage starts immediately when the receiver is switched on, starting of the oscillator and of modulator 11 also is ensured. Modulator 11 controls an amplifier 33 which supplies a control current to the base of transistor 10 and which is fed by the same supply voltage at point D as transistor 10. It is obvious that other parts of the receiver may be supplied by this voltage or by that at the emitter of transistor 10.

A diode 34 prevents the voltage at point A from becoming negative when transistor 10 fails. Otherwise the base of transistor 1 would continue to get a positive control voltage. Any disturbing oscillations are damped by an RC-network 35 connected parallel to winding 12 and a further RC-network 36 between the base of transistor 1 and ground. The transistors in the circuit of FIG. 4 are the following Philips types: the transistor of amplifier 33:BC 548; transistor 10: BD 232; transistor 1: BU 208. Diode 18 is a BY 207, capacitor 19 has a capacitance of approximately 100 nF, while resistor 14' has a value of approximately 33kΩ and a permissible power of 5.5W. The nominal voltages are: $V_B$ = 300V, $V_D$=650V, $V_A$ = 120V while the voltage across capacitor 31 is stabilized at approximately 140V and that across diode 32 at approximately 12V.

What is claimed is:

1. A switched-mode power supply circuit for converting an input voltage to a substantially constant output d.c. voltage comprising, a switching device, a driver stage for supplying a periodic pulse-shaped control signal to a control electrode of said switching device to render it conducting during a first part of the control signal period and to block it during a remaining second part of the period, means for controlling the duration of said parts of the period, means connecting an output electrode of an switching device to a terminal of the input voltage source through a self-inductance, a rectifier, a smoothing capacitor, means coupling one electrode of said rectifier to said self-inductance, means connecting the other electrode of the rectifier to said smoothing capacitor and to a supply resistor for the driver stage so that the direct current power supply voltage for the driver stage is supplied thereto from said terminal of the input voltage source via said supply resistor.

2. A circuit as claimed in claim 1 wherein the driver stage comprises a transistor and the supply resistor comprises the collector resistor of the transistor.

3. A circuit as claimed in claim 2 further comprising a voltage stabilizing element included in the emitter lead of the transistor for deriving a supply voltage.

4. A circuit as claimed in claim 1 wherein the driver stage comprises a transistor and with the supply resistor connected to couple the collector thereof to said terminal of the input voltage source via said rectifier and said self-inductance, said circuit further comprising a zener diode connected to the emitter of said transistor for developing a supply voltage at a terminal of the zener diode.

5. A switched-mode voltage regulator comprising, an input terminal for a source of unregulated voltage, inductance means, a switching device, means connecting an output electrode of the switching device to said input terminal via said inductance means, a driver stage for supplying a periodic control signal to said switching device to cause it to conduct during a first part of the control signal period and to cause it to cut-off during a second part of said period, means including the driver stage for controlling the relative duration of said first and second parts of the control signal period as a function of the regulated output voltage of the voltage regulator, a diode, a capacitor, a resistor, means connecting the diode and capacitor in series across a part of said inductance means, means connecting the resistor between a terminal of said diode and an output electrode of the driver stage so that the direct current power supply voltage for the driver stage is supplied from the input terminal via said resistor and diode and wherein said resistor is operative to damp undesired oscillations that may appear in said inductance means, and means for coupling said inductance means to an output terminal of the voltage regulator.

6. A voltage regulator as claimed in claim 5 wherein said inductance means comprises a transformer having a primary winding connected to said switching device output electrode and to said input terminal and a secondary winding coupled to said output terminal via a second diode.

7. A voltage regulator as claimed in claim 5 wherein said inductance means comprises a transformer having a primary winding connected between said switching device output electrode and said input terminal and a secondary winding coupled to said output terminal, said diode being connected to a junction between the switching device output electrode and one terminal of the primary winding and said resistor being connected to a junction between the diode and the capacitor and to said driver stage output electrode, said diode being poled to pass a direct current from said input terminal to said driver stage output electrode via said primary winding, said diode and said resistor.

8. A voltage regulator as claimed in claim 7 wherein said driver stage comprises a first transistor with its output electrode coupled to said resistor via the primary winding of a second transformer, said switching device comprises a second transistor having its base coupled to a secondary winding of the second transformer, and said means for controlling the relative duration of the first and second parts of the control signal period includes a modulator having one input coupled to the output terminal of the voltage regulator.

9. A voltage regulator as claimed in claim 5 wherein the driver stage includes a transistor and said resistor comprises the transistor collector supply resistor, and said voltage regulator further comprises a voltage stabilizing element connected to the emitter of said transistor for deriving a further D.C. supply voltage.

10. A voltage regulator as claimed in claim 5 wherein the driver stage includes a transistor and said output electrode of the driver stage comprises the collector electrode of said transistor.

* * * * *

UNITED STATES PATENT AND TRADEMARK OFFICE
CERTIFICATE OF CORRECTION

PATENT NO. : 4,031,453
DATED : June 21, 1977
INVENTOR(S) : DIRK JOHAN ADRIAN TEULING It is certified that error appears in the above-identified patent and that said Letters Patent are hereby corrected as shown below:

IN THE SPECIFICATION

Col. 1, line 41, "considerable" should be --considerable,--;

col. 4, line 37, after "to" there should be --9.2%--.

IN THE CLAIMS

Claim 1, line 10 "an" should be --the-- and after "a terminal of", "the" should be --an--.

Signed and Sealed this

Second Day of May 1978

[SEAL]

Attest:

RUTH C. MASON
Attesting Officer

LUTRELLE F. PARKER
Acting Commissioner of Patents and Trademarks